June 11, 1963 F. W. FORST 3,092,921
METHOD OF AND MEANS FOR CONTROLLING EARTH MOVING EQUIPMENT
Filed April 30, 1962 3 Sheets-Sheet 1

INVENTOR
FRANK W. FORST
BY
Talbert Dick & Darley
ATTORNEYS

June 11, 1963 F. W. FORST 3,092,921
METHOD OF AND MEANS FOR CONTROLLING EARTH MOVING EQUIPMENT
Filed April 30, 1962 3 Sheets-Sheet 3

INVENTOR
FRANK W. FORST
BY
Talbert Dick & Farley
ATTORNEYS

United States Patent Office 3,092,921
Patented June 11, 1963

3,092,921
METHOD OF AND MEANS FOR CONTROLLING EARTH MOVING EQUIPMENT
Frank W. Forst, 3316 Pratt St., Omaha, Nebr.
Filed Apr. 30, 1962, Ser. No. 190,986
6 Claims. (Cl. 37—129)

This invention relates to the method of and means for controlling earth moving equipment and more particularly to electronic devices for signalling, timing and counting the cycle phases between the combined operation of the powered earth collecting and hauling vehicle and the auxiliary power tractor.

In the earth moving art it is standard procedure to use a motorized scoop hauling vehicle and one or more crawler tractors to serve as auxiliary power to push the scoop and hauling vehicle at the time it is scooping up the dirt from the excavation area.

Earth moving is essentially a production operation based on critical times to perform given operations such as loading, hauling, dumping, and like. The most critical of these operations is the loading time. It is during this period that the machinery receives its most severe wear and tear and also each second spent which does not add materially to the size of the load severely cuts the over-all production. This is especially true on short haul work such as 500 feet and under. The majority of all earth moving falls into this class. There is therefore an optimum loading time. That is, a given point in a particular soil condition, if more time is spent to increase the load beyond this optimum figure, the additional time spent is not paid for by the increased load. The optimum load time is based on several factors, i.e., size of haul unit, size of pushing tractor, type of soil, up or down hill loading, operator capability, and like. These factors change from operation to operation and area to area, but usually remain fairly constant on a given production job in the same location. By means of a graph it can be shown that even five or ten seconds wasted in the cut has a tremendous effect on the over-all production.

Many experts, therefore, have advocated the controlled loading time principle. However, herebefore there has been no acceptable method or means to put the principle into operation.

Therefore one of the principal objects of my invention is to provide a device for use in earth moving equipment that will time the loading phase and indicate to the operators of the equipment not only the total time for each sequence but the time remaining to complete a given operation.

A further object of this invention is to provide a method of and means for automatically counting and recording the completed operations for a given period of time.

A still further object of this invention is to provide a signal means that is capable of controlling and co-ordinating the movement and operation of a plurality of co-operating vehicles.

Still further objects of my invention are to provide a method of and means for controlling earth moving equipment that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

As herebefore indicated, I am particularly interested in three specific phases of this invention. Firstly, it is necessary to have an adjustable timing means in the circuitry. Electricity powered timing devices are old. Even housewives use such adjustable electrically powered timers for cooking purposes. Such timers may be set for any suitable period and in the case of electric alarms an alarm will sound at a predetermined setting, be silent for a given period of time, and then will sound the second alarm, all automatically. Such electrically powered timers and/or alarm means may be used in combination with the various elements of my device. However, even a spring actuated timing means may be used.

Secondly, my system requires three signal lamps operatively electrically connected to the timer. Preferably the three lamps are distinguishable from each other by color. One color may indicate the availability of the tractor, another color may indicate that contact has been made and the time cycle started, and the beginning of the shining of another color may indicate the remaining time period in which the cycle must be completed. Thirdly, there must be a cumulative or tabulating counter to record the number of completed cycle operations in a given length of time.

Figure 4:
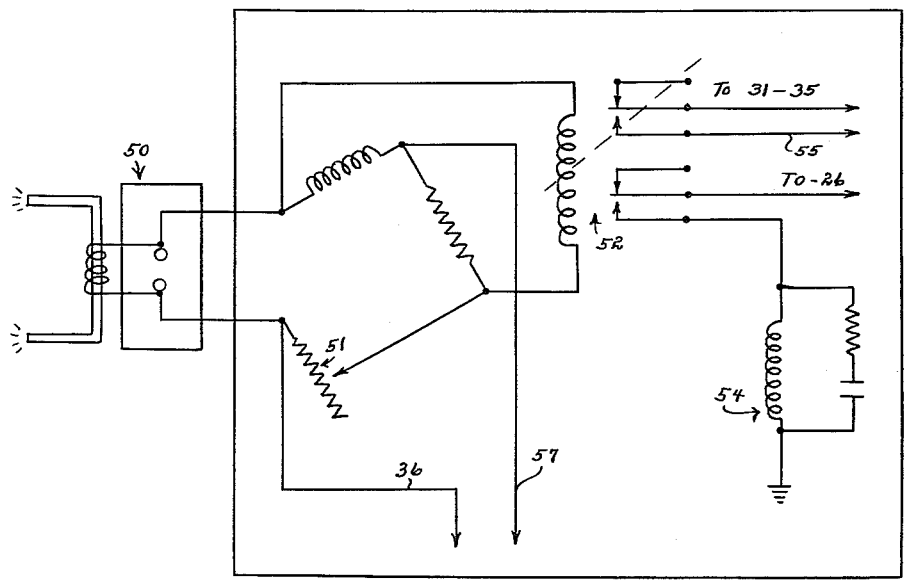
FIG. 4 is an illustrative wiring diagram of one method of automatically starting the device into a cycle.

A fourth phase of my invention is a means for setting the electronic mechanism for each cycle operation. This setting of the mechanism may be done by hand by the operator of the tractor or it may be accomplished automatically. FIG. 4 shows one method of automatically setting the mechanism in operation, and its description will be discussed later.

Figure 1:
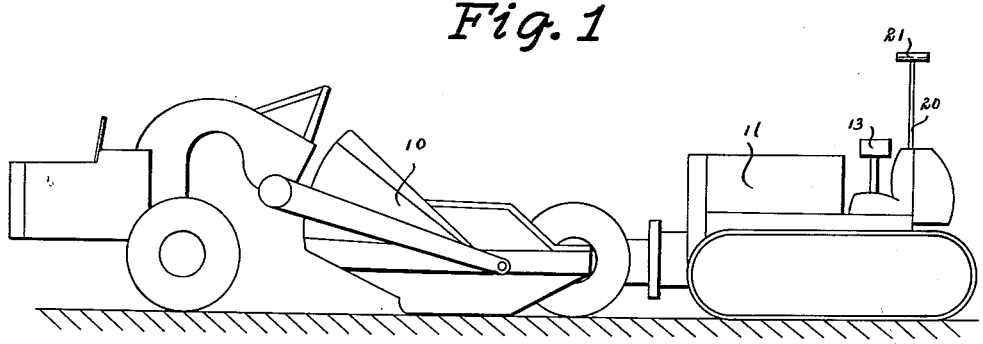
FIG. 1 is a side diagrammatical view of a dirt-scoop carrier and a pushing tractor using my control means.
Figure 2:
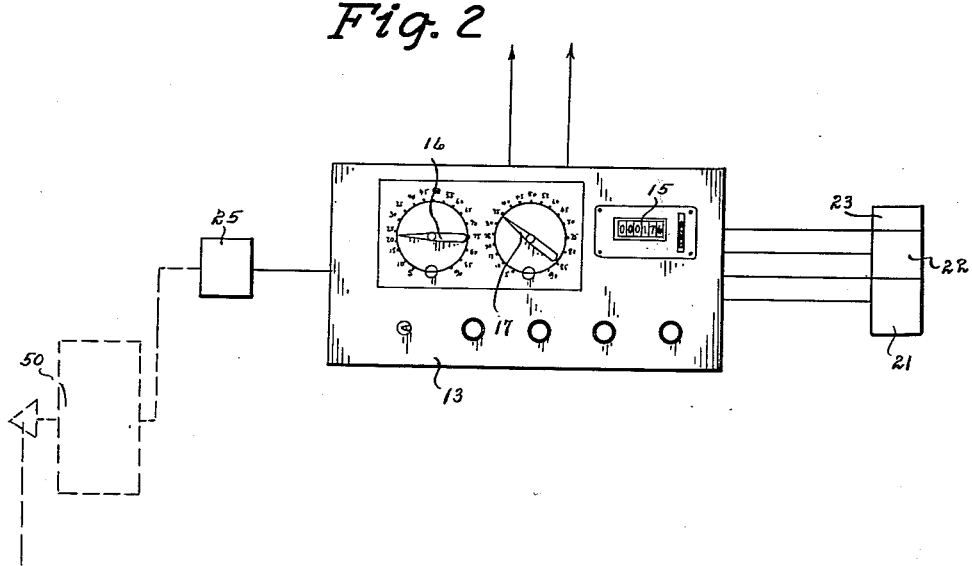
FIG. 2 is a general diagrammatical view of my device.
Figure 3:
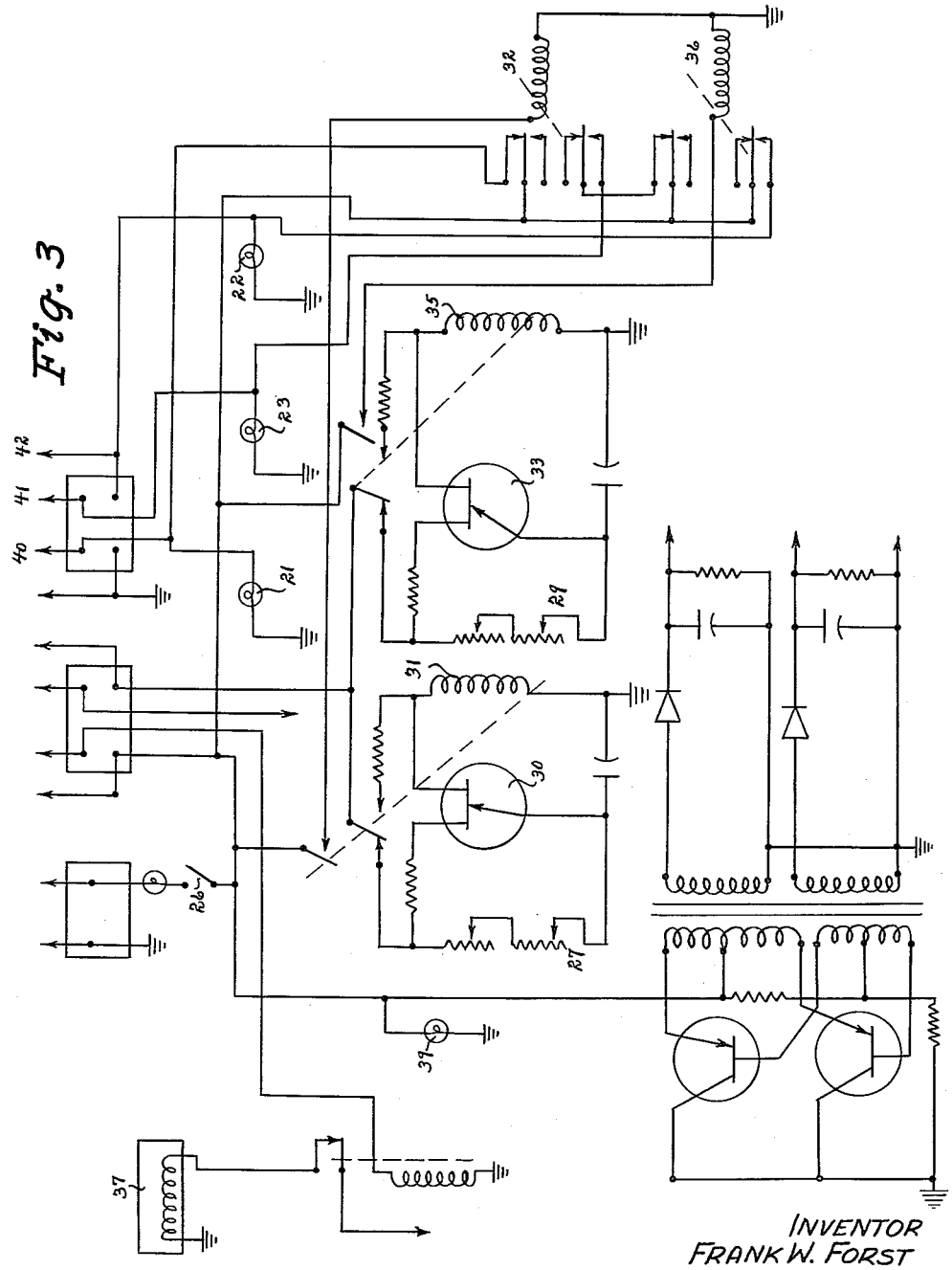
FIG. 3 is an illustrative wiring diagram of one type of circuitry that may be used for the main control unit.

In the drawings, I have used the numeral 10 to generally designate a common scoop type powered dirt carrying vehicle and the numeral 11 to generally designate an ordinary powered pushing tractor. All of my equipment is installed on the tractor 11. The numeral 13 designates a housing mounted on the tractor and preferably facing the operator of the tractor. The electronic counter 15 has its dial observable in the side of the housing as shown in FIG. 2. Also on this side of the housing are the two timer adjusting dial levers 16 and 17. Most of the circuitry of the counter and timer means is inside the housing 13. The numeral 20 designates a vertical post conduit on the tractor and which extends to a height substantially above the tractor. At the top of the post 20 are three incandescent lamp means, i.e., the numeral 21 for a red colored lamp, the numeral 22 for a green colored lamp, and the numeral 23 for an amber colored lamp. Obviously the circuitry of the box 13 is operatively connected to these three lamp signals as shown in FIG. 3. With the device installed and electrically connected to a suitable source of electrical energy, the two timers 16 and 17 are manually set for the desired time intervals. As an illustration, the timer 16 and which is operatively electrically connected to the red lamp may be set to go on for a period of twenty-five seconds, after which the timer 17, which is operatively electrically connected to the amber lamp 23, goes on and which may be set for a period of time such as ten seconds. After the amber lamp has been illuminated for ten seconds it is extinguished and the green lamp 22 goes on automatically. If the device is manually set to start a cycle of operation, the operator of the pushing vehicle closes the switch means 25 at the moment the pushing vehicle engages the scooping and carrying vehicle 10. Herebefore the green signal lamp 22 was illuminated with no time period limit to indicate that the pushing vehicle was available. However, immediately upon closing the switch 25, the timer 16 starts to function, the green lamp goes out and the red lamp is illuminated. The aiding of the dirt filling into the vehicle 10 by the pushing vehicle continues. However, if the timer 16 is set for twenty-five seconds, at the end of this period the timer 17 will take up the timing, the red lamp will go out and the amber lamp will be illuminated. If the timer 17 is set for say ten seconds, the operator of the pushing vehicle will know upon seeing the amber light that he has only ten seconds to complete his mission. At the end of the ten seconds the amber light will go out and the green lamp go on. The operator of the pushing vehicle will know that any further aid to the scooping and hauling vehicle would be a waste of time and energy. Therefore as soon as the signal means shows "green" he will withdraw and be ready to aid the next scooping and hauling vehicle.

Figure 5:
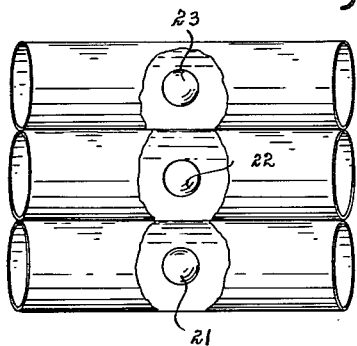
FIG. 5 is an enlarged top view of my signal lamps with sections cut away to more fully illustrate their structure.

Referring to the wiring diagram shown in FIG. 3, the operator closes switch 26. The device may first go through one complete cycle for test purposes. With the closing of the switch 26, the counter will be activated once (or each time the red light goes on). If the time period for the red lamp is twenty-five seconds, the time control 27 for stage one would be set for twenty-five seconds. If the total pushing time was to be for thirty-five seconds, the time control 29 for stage two would be set for thirty-five seconds. At the end of twenty-five seconds, transistor 30 fires and activates relay 31. This, in turn, causes relay 32 to close and this turns off red lamp and turns on the amber lamp. At the end of the thirty-five seconds the transistor 33 fires causing relay 35 to activate, which in turn causes relay 36 to close thus turning off the amber lamp and the green lamp on. In this diagram the counter is designated by the numeral 37, the numeral 39 the pilot light, the numeral 40 the red circuit, the numeral 41 the amber circuit and the numeral 42 the green circuit. The lamps are designated the same as in FIG. 5. However, any desired circuitry may be used to accomplish the timed signal means.

As herebefore indicated, the illumination of the red lamp may be automatic and the start of a new cycle whenever the pushing vehicle engages or comes into close contact with the scooping and hauling vehicle. Any suitable device may be used for this purpose, such as a physically depressible switch on the front of the pushing vehicle, a proximity switch, a telephoto switch, or like. In FIG. 4 I show the circuitry of one method. It may be mounted back of the push plate of the pushing vehicle 11. The wiring employs a pick up transducer 50. The induction bridge is placed in balance after mounting by the variable resistor 51. When the bridge is in balance, no current will flow through relay 52. When the pushing vehicle makes contact with the hauling vehicle, the additional mass of metal throws the bridge out of balance and current will then flow through relay 52 causing the relay contacts to close. The contacts thus made actuates the load counter and starts the timing cycle. When the pushing vehicle pulls away from the scooping and hauling vehicle, the bridge returns to balance and releases relay 52, and the unit is then ready for the next cycle. The circuit to the above described transducer goes through the relay in stage one of the timing circuit shown in FIG. 3. The reason for this is for a "holding circuit" so that if during the pushing cycle (once the time has started) and the vehicles lose momentary contact, a second load will not be tallied for the one cycle. This holding circuit means is designated at 54. The power line is designated 55. Leads 56 and 57 are connected to the secondary winding ahead of the diode rectifier.

Some changes may be made in the construction and arrangement of my method of and means for controlling earth moving equipment without departing from the real spirit and purpose of my invention, and it is my intention to cover by my claims, any modified forms of structure or use of mechanical equivalents which may be reasonably included within their scope.

I claim:
1. In a means for controlling earth moving equipment, comprising, in combination,
   (a) a scoop type dirt carrying powered vehicle,
   (b) a pushing powered vehicle adapted to engage and push the dirt carrying vehicle during the loading phase,
   (c) at least two signal means on said pushing vehicle each of a different distinguishable character from the other,
   (d) a timer means operatively connected to at least one of said signal means,
   (e) means for count-recording each time said timer means is used;
   (f) said two signal means, said timer means, and said count-recording means electrically connected; and
   (g) means electrically connected to said timer means for electrically actuating said timer means.

2. In a means for controlling earth moving equipment, comprising, in combination,
   (a) a scoop type dirt carrying powered vehicle,
   (b) a pushing vehicle adapted to engage and push the dirt carrying vehicle during the loading phase,
   (c) a first electricity actuated signal means on said pushing vehicle,
   (d) a second electricity actuated signal means on said pushing vehicle and of a character distinguishable from said first signal means.
   (e) a third electricity actuated signal means on said pushing vehicle and of a character distinguishable from said first and said second signal means.
   (f) an electricity actuated timing means on said pushing vehicle having a circuitry and switching means electrically connected to said first, second, and third signal means for selective actuation thereof whereby said first signal means will be actuated for a given period followed by the actuating of said second signal means for a given time period, and whereby said third signal means will be actuated when said first and second signal means are not activated,
   (g) said circuitry of said timing means electrically connected to a source of electrical energy, and
   (h) a power transforming device including a switch means in said circuitry of said timing means for starting said timing means to acutuate said first signal means.

3. In a means for controlling earth moving equipment, comprising, in combination,
   (a) a scoop type dirt carrying powered vehicle,
   (b) a pushing powered vehicle adapted to engage and push the dirt carrying vehicle during the loading phase,
   (c) a first electricity actuated signal means on said pushing vehicle,
   (d) a second electricity actuated signal means on said pushing vehicle and of a character distinguishable from said first signal means,
   (e) a third electricity actuated signal means on said pushing vehicle and of a character distinguishable from said first and said second signal means,
   (f) an electricity actuated timing means on said pushing vehicle having a circuitry and switching means electrically connected to said first, second, and third signal means for selective actuation thereof, whereby said first signal means will be actuated for an adjustable given time period followed by the actuating of said second signal means for an adjustable given time period, and whereby said third signal means will be actuated when said first and second signal means are not activated, (g) said circuitry of said timing means electrically connected to a source of electrical energy, and (h) a switch means in said circuitry of said timing means mounted on said pushing powered vehicle and responsive to the proximity of a metallic mass other than said pushing powered vehicle, said switch means for starting said timing means to actuate said first signal means.

4. In a means for controlling earth moving equipment, comprising, in combination, (a) a scoop type dirt carrying powered vehicle, (b) a pushing powered vehicle adapted to engage and push the dirt carrying vehicle during the loading phase, (c) a first electricity actuated signal means on said pushing vehicle, (d) a second electricity actuated signal means on said pushing vehicle and of a character distinguishable from said first signal means, (e) a third electricity actuated signal means on said pushing vehicle and of a character distinguishable from said first and second signal means, (f) an electricity actuated timing means on said pushing vehicle having a circuitry and switching means electrically connected to said first, second, and third signal means for selective actuation thereof, whereby said first signal means is actuated for a given time period followed by the actuating of said second signal means for a given time period, and whereby said third signal means is actuated when said first and second signal means are not activated, (g) said circuitry of said timing means electrically connected to a source of electrical energy, and (h) a switch means in said circuitry of said timing means for starting said timing means to actuate said first signal means;

(i) said last mentioned switch means actuated by the pushing vehicle coming into proximity with said carrying vehicle.

5. In a means for controlling earth moving equipment, comprising, in combination, (a) a scoop type dirt carrying powered vehicle, (b) a pushing powered vehicle adapted to engage and push the dirt carrying vehicle during the loading phase, (c) a first electricity actuated signal means on said pushing vehicle, (d) a second electricity actuated signal means on said pushing vehicle and of a character distinguishable from said first signal means, (e) a third electricity actuated signal means on said pushing vehicle and of a character distinguishable from said first and said second signal means, (f) an electricity actuated timing means on said pushing vehicle having a circuitry and switching means electrically connected to said first, second, and third signal means for selective actuation thereof whereby said first signal means is actuated for a given time period followed by the actuating of said second signal means for a given time period, and whereby said third signal means is actuated when said first and second signal means are not activated.

(g) said circuitry of said timing means electrically connected to a source of electrical energy, and (h) a switch means in said circuitry of said timing means for starting said timing means to actuate said first signal means;

(i) said last mentioned switch means automatically actuated in response to engagement between said pushing vehicle and said carrying vehicle.

6. In a means for controlling earth moving equipment, comprising in combination, (a) a scoop type dirt carrying powered vehicle, (b) a pushing powered vehicle adapted to engage and push the dirt carrying vehicle during the loading phase, (c) a first electricity actuated signal means on said pushing vehicle, (d) a second electricity actuated signal means on said pushing vehicle and of a character distinguishable from said first signal means, (e) a third electricity actuated signal means on said pushing vehicle and of a character distinguishable from said first and said second signal means, (f) an electricity actuated timing means on said pushing vehicle having a circuitry and switching means electrically connected to said first, second, and third signal means for selective actuation thereof whereby said first signal means will be actuated for a given time period followed by the actuating of said second signal means for a given time period, and whereby said third signal means will be actuated when said first and second signal means are not activated, (g) said circuitry of said timing means electrically connected to a source of electrical energy, (h) a switch means in said circuitry of said timing means for starting said timing means to actuate said first signal means, and (i) a count recording means actuated each time said first signal means is actuated.

References Cited in the file of this patent

UNITED STATES PATENTS

| | | |
|---|---|---|
| 2,906,333 | Ritzenthaler | Sept. 29, 1959 |
| 2,932,779 | Tancig | Apr. 12, 1960 |
| 2,986,827 | Peterson | June 6, 1961 |